(12) United States Patent
Jaeger et al.

(10) Patent No.: US 8,434,147 B2
(45) Date of Patent: Apr. 30, 2013

(54) METHOD, SYSTEM AND PROGRAM PRODUCT FOR REMOTELY VERIFYING INTEGRITY OF A SYSTEM

(75) Inventors: Trent R. Jaeger, Port Matilda, PA (US); Reiner Sailer, Scarsdale, NY (US); Leendert P. Van Doorn, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 1535 days.

(21) Appl. No.: 11/268,220

(22) Filed: Nov. 7, 2005

(65) Prior Publication Data

US 2007/0107046 A1 May 10, 2007

(51) Int. Cl.
*H04L 29/06* (2006.01)
(52) U.S. Cl.
USPC ............................................. 726/22; 726/25
(58) Field of Classification Search .......... None
See application file for complete search history.

(56) References Cited

U.S. PATENT DOCUMENTS

| | | | |
|---|---|---|---|
| 5,421,006 A * | 5/1995 | Jablon et al. | 714/36 |
| 2004/0268145 A1* | 12/2004 | Watkins et al. | 713/201 |
| 2006/0161978 A1* | 7/2006 | Abadi et al. | 726/22 |
| 2006/0195732 A1* | 8/2006 | Deutschle et al. | 714/724 |
| 2006/0218637 A1* | 9/2006 | Thomas et al. | 726/23 |

* cited by examiner

*Primary Examiner* — Benjamin Lanier
(74) *Attorney, Agent, or Firm* — Preston Young; Hoffman Warnick LLC

(57) ABSTRACT

The present invention provides a computer-implemented method system and program product for remotely verifying (e.g., analytic) integrity of a system. Specifically, at startup of the system an access control policy that sets forth information flows within the system is read and a set of trusted subjects that interact with a target application in the system is determined. Based on the access information flows and the set of trusted subjects, an information flow graph of the system is constructed. At runtime of the target application, runtime information and program code loaded into the set of trusted subjects are measured. Measuring the program code that is loaded allows the remote party to verify that the program code is "expected" program code for the set of trusted subjects.

20 Claims, 1 Drawing Sheet

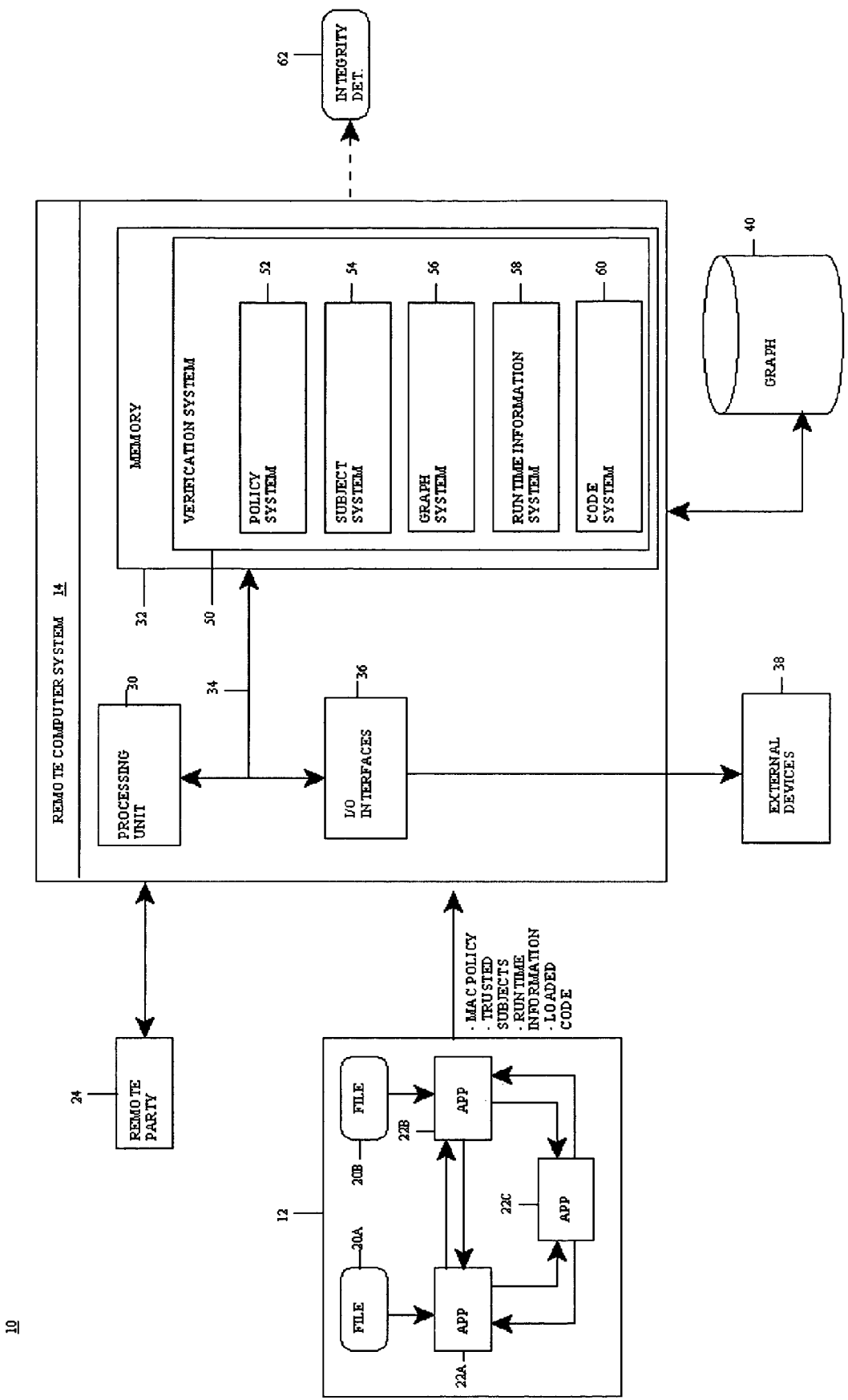

METHOD, SYSTEM AND PROGRAM PRODUCT FOR REMOTELY VERIFYING INTEGRITY OF A SYSTEM

BACKGROUND OF THE INVENTION

1. Field of the Invention

The present invention generally relates to system integrity verification. Specifically, the present invention relates to a computer-implemented method, system and program product for remotely verifying (e.g., analytic) integrity of a system.

2. Related Art

As computer infrastructures grow in popularity and capability, there is an ever growing need to be able to verify the integrity of software that is running therein. Traditional approaches have focused on locally examining the program code that is running on the system in an attempt to verify proper execution. While performing integrity verification on security-critical applications is important for the user or administrator of that system, allowing remote parties to verify the system's integrity can have additional benefits. For example, people connecting to a web site may want some assurance that the system is properly set up before revealing personal information. Network administrators may want to check that laptops are configured appropriately before allowing them to connect to a local network.

Unfortunately, existing approaches fail to provide for remote verification of integrity (e.g., analytic) of a system. That is existing approaches fail to take into consideration many factors such as information flows, trusted subjects, etc.

SUMMARY OF THE INVENTION

In general, the present invention provides a computer-implemented method system and program product for remotely verifying (e.g., analytic) integrity of a system (i.e., a target application thereof). Specifically, at startup of the system, an access control policy that sets forth information flows within the system is read and a set of trusted subjects that interact with a target application in the system is determined. The information flows in the access control policy are typically information flows between applications and files of the system and are defined in the access control policy based on corresponding subject labels and object labels. In any event, based on the information flows and the set of trusted subjects, an information flow graph of the system is constructed. This allows a remote party to verify that all "edges" into the target application originate from one of the set of trusted subjects or from an un-trusted subject via a filtering interface. Then, at runtime of the target application, runtime information and program code loaded into the set of trusted subjects are measured. Measuring the loaded program code allows the remote party to verify that the program code is "expected" program code for the set of trusted subjects. Based on the information flow graph, the runtime information and the loaded program code, an (e.g., analytic) integrity determination can be made.

A first aspect of the present invention provides a computer-implemented method for remotely verifying integrity of a system, comprising: reading an access control policy that sets forth information flows within the system; determining a set of trusted subjects that interact with a target application in the system; constructing an information flow graph of the system based on the access control policy and the set of trusted subjects; and measuring program code loaded into the set of trusted subjects.

A second aspect of the present invention provides a system for remotely verifying integrity of a system, comprising: a policy system for reading an access control policy that sets forth information flows within the system; a subject system for determining a set of trusted subjects that interact with a target application in the system; a graph system for constructing an information flow graph of the system based on the access control policy and the set of trusted subjects; and a code system for measuring program code loaded into the set of trusted subjects.

A third aspect of the present invention provides a program product stored on a computer useable medium for remotely verifying integrity of a system, the program product comprising program code for causing a computer system to perform the following steps: reading an access control policy that sets forth information flows within the system; determining a set of trusted subjects that interact with a target application in the system; constructing an information flow graph of the system based on the access control policy and the set of trusted subjects; measuring runtime information of the system; and measuring program code loaded into the set of trusted subjects.

A fourth aspect of the present invention provides a method for deploying an application for remotely verifying integrity of a system, comprising: providing a computer infrastructure being operable to: read an access control policy that sets forth information flows within the system; determine a set of trusted subjects that interact with a target application in the system; construct an information flow graph of the system based on the access control policy and the set of trusted subjects; and measure program code loaded into the set of trusted subjects.

A fifth aspect of the present invention provides computer software embodied in a propagated signal for remotely verifying integrity of a system, the computer software comprising instructions for causing a computer system to perform the following steps: reading an access control policy that sets forth information flows within the system; determining a set of trusted subjects that interact with a target application in the system; constructing an information flow graph of the system based on the access control policy and the set of trusted subjects; measuring runtime information of the system; and measuring program code loaded into the set of trusted subjects.

Therefore, the present invention provides a computer-implemented method system and program product for remotely verifying (e.g., analytic) integrity of a system.

BRIEF DESCRIPTION OF THE DRAWINGS

These and other features of this invention will be more readily understood from the following detailed description of the various aspects of the invention taken in conjunction with the accompanying drawing that depicts various embodiments of the invention, in which:

FIG. 1 depicts a system for remotely verifying integrity of a system according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

For convenience purposes the Detailed Description of the Invention will have the following sections:

I. General Description
II. Definitions
III. Typical Embodiment
IV. Computerized Implementation

I. General Description

The present invention provides a computer-implemented method system and program product for remotely verifying (e.g., analytic) integrity of a system (i.e., a target application thereof). Specifically, at startup of the system, an access control policy that sets forth information flows within the system is read and a set of trusted subjects that interact with a target application in the system is determined. The information flows in the access control policy are typically information flows between applications and files of the system and are defined in the access control policy based on corresponding subject labels and object labels. In any event, based on the information flows and the set of trusted subjects, an information flow graph of the system is constructed. This allows a remote party to verify that all "edges" into the target application originate from one of the set of trusted subjects or from an un-trusted subject via a filtering interface. Then, at runtime of the target application, runtime information and program code loaded into the set of trusted subjects are measured. Measuring the loaded program code allows the remote party to verify that the program code is "expected" program code for the set of trusted subjects. Based on the information flow graph, the runtime information and the loaded program code, an (e.g., analytic) integrity determination can be made.

II. Definitions

Before the teachings of the present invention are described in greater detail, some underlying definitions and associated explanations will be given. As indicated above, the present invention allows (e.g., analytic) integrity of a system to be remotely verified. To this extent, this section will discuss analytic integrity and its utilization of other concepts such as MAC policies, information flows, filtering interfaces, Biba integrity, Clark-Wilson integrity etc.

In general, analytic integrity is an adapted version of the Clark-Wilson integrity model. Specifically, analytic integrity differs from Clark-Wilson in at least two key ways: (1) only interfaces that accept un-trusted inputs are required to have filtering abilities; and (2) analytic integrity typically requires that developers make explicit which interfaces implement filtering.

A. Basic Information Flow Integrity

In basic information flow integrity models, dependence on low integrity data is defined in terms of information flows. Such models require that no low integrity information flows may be input to a high integrity subject. The present invention begins with a definition of information flow based on two operators, modify and observe where: (1) mod(s, o) is the modify operator where a subject (e.g., a process or user) with subject label s writes to an object (e.g., a file or socket) with object label o and (2) obs(s, o) is the observe operator where a subject of subject label s reads from an entity of object label o. Subsequently, $s_i$ is used to refer to an arbitrary subject and to $S=\{s_i\}$ as the set of subjects. Analogously, $o_j$ is a single object type and $O=\{o_j\}$ is the set of objects.

A1. Definition 1 (Basic Information Flow)

Under the present invention, flow(si; s) specifies that information flows from subject $s_i$ to subject s.

$$\text{flow}(s_i, s) := \text{mod}(s_i, o) \hat{} \text{obs}(s, o)$$

Next, the operator int(x) defines the integrity level of x where it may be either a subject or an object. In information flow integrity models, integrity levels are related by a lattice where int(x)>int(y) means that y may depend on x, but not vice versa. For the purposes of the present invention, this means that trusted processes may not depend on un-trusted processes. In integrity models, special kinds of subjects can accept low-to-high integrity flows. For example, the Biba integrity model permits multi-level secure processes to upgrade the integrity of inputs. These multi-level secure processes are high assurance (i.e., formal, comprehensive validation of program correctness, such as Common Criteria EAL7 evaluation) programs entrusted with upgrading information flows correctly. Such assurance is a time consuming, largely manual task.

A2. Definition 2 (Biba Integrity)

Biba integrity is preserved for a subject s if: (1) all high integrity objects meet integrity requirements initially; and (2) all information flows to a subject s be from subjects of equal or higher integrity:

$$\forall s_i \in S, \text{flow}(s_i, s) \Rightarrow (\text{int}(s_i) \geq \text{int}(s))$$

Other information flow based integrity models, such as LOMAC, operate differently, but they have the same information flow integrity semantics as defined above.

It is noted that while information flow is transitive in general, only intransitive information flows need to be examined to detect a Biba integrity violation. For example, suppose that A and B are un-trusted and X and Y are trusted. If there is a transitive information flow from A to B to X to Y, only the flow from B to X is needed to trigger a Biba integrity violation. It does not impact Biba integrity further that information can flow from other low integrity subjects through B to X. It is the flow from B to X that is required to trigger the violation.

B. Clark-Wilson Integrity

The Clark-Wilson integrity model provides a different view of dependence. Security-critical processes may accept low integrity information flows, but the whole program must be formally verified. In particular, it must either discard or upgrade all the low integrity data from all input interfaces. The key to eliminating dependence on low integrity information flows is the presence of filtering interfaces that implement the discarding or upgrading of low integrity data. The Clark-Wilson integrity model does not distinguish among program interfaces, but treats the entire security-critical program as a highly assured black box. As a result, all interfaces should be filtering interfaces

B1. Definition 3 (Clark-Wilson Integrity)

Clark-Wilson integrity is preserved for a subject s if: (1) all high integrity objects meet integrity requirements initially; (2) the behavior of the programs of subject S are assured to be correct; and (3) all interfaces filter (i.e., upgrade or discard) low integrity information flows.

While the Clark-Wilson model does not require separate multi-level secure processes, it requires a significant assurance effort. An important point to note is that since a Clark-Wilson application programmer cannot know the system's information flows in advance, all interfaces must be assured to be filtering interfaces. In practice, often only a small number of interfaces actually need to capable of filtering in the context of a real system. This set can be derived from analyzing the system's security policy. This observation in developing analytic integrity under the present invention.

C. Analytic Integrity

Information flow in terms of a connection between subject labels and their program interfaces will now be defined. For this, a more precise obs operator is needed: obs(s, I, o) means that the subject s reads an object of type o on interface I. An interface for a subject is the point at which information is input, for example a particular read( ) call in a program.

C1. Definition 4 (Interface Information Flow)

flow($s_i$, s, I) specifies that information flows from subject $s_i$ to subject s through an interface I in a program running as subject s.

$$\text{flow}(s_i, s; I) := \text{mod}(s_i, o) \hat{} \text{obs}(s, I, o)$$

To this extent, analytic integrity in terms of interface information flows will now be defined.

C2. Definition 5 (Analytic Integrity) Analytic Integrity is preserved for a subject s if: (1) all high integrity objects meet integrity requirements initially; (2) all trusted code is identifiable as high integrity (e.g., from its hash value as for NGSCB); and (3) all information flows to s are from subjects of equal or higher integrity unless they occur through a programmer-annotated filtering interface I, which is identified by the predicate f(s; I):

$$flow(s_i, s, I)^\neg f(s, I) \to (int(s_i) \geq int(s))$$

That is, analytic integrity requires that the target application's information flows either adhere to classical integrity or that un-trusted (low-integrity) inputs are handled by a filtering interface.

D. Developing Analytic Integrity Systems

In this section the analytic integrity tasks implied by above discussion is discussed. In general, the tasks are split between application developers and system administrators as follows:

An application developer should: (1) assume some Trusted Computer Base (TCB) and application configuration, identify un-trusted inputs to the program and implement filtering interfaces for each; (2) annotate those interfaces with a DO FILTER annotation; and (3) (possibly in conjunction with a distribution maintainer) construct a default security policy for the application that has two subject types: the default only allows inputs from the TCB, and the other, for filtering interfaces, allows required types of un-trusted inputs as well. Since application developers should be sanitizing their un-trusted inputs anyway, this represents only a small amount of additional work to enable system level integrity verification.

A system administrator must: (1) (one time only) choose a system TCB; (2) run the security policy analysis tool for the target application; (3) if no integrity-violating permissions are detected, then skip the next step.; and (4) classify each integrity-violating permission found by the tool to decide how to remove the illegal flow.

The approach of the present invention allows each system administrator to decide what to trust on his/her system. The administrator can evaluate the risk of running a particular application in terms of what must be trusted in order to run it.

E. SELinux

The SELinux module is a Linux Security Module (LSM) that provides fine-grained, comprehensive MAC enforcement using the LSM framework. SELinux has a fine-grained default policy model, an extended form of Type Enforcement (TE) with domain transitions that enables expression of policies covering over 30 different types of objects with about 10 operations each. SELinux is comprehensive because it aims to control all programs' accesses to all security-relevant system objects.

Key notions in SELinux are those of subject types and object types. A process' security context is determined by its subject type, much as the security context of an ordinary UNIX process is determined by its effective UID. Likewise, non-process objects like files are associated with an object type. Permissions are attached to a subject type in policy files; if an Apache process has the subject type apache t, and its configuration file has object type apache_config-t, a statement such as the following could be presented:

allow apache_t pache_config_t:file

{stat read} to allow Apache to call stat( ) on or read from its configuration file. Although there are several access control concepts in the SELinux policy model besides allow permissions by subjects on objects, only one other is relevant to information flow. The relabel operations enable a subject to change the object label of an object. This enables information flow from the old object label to the new one. While it provides great control and flexibility, such fine-grained, comprehensive control results in very large and complex access control policies. There are over 5,000 permission assignment rules (allow) in the policy itself (in the file policy.conf). Note that this policy contains just the base subjects. The complete policy, including policies for all shipping applications, is about ten times greater in size. As a result, understanding the higher-level properties that a policy implies, such as information flow, is difficult to perform manually.

F. Supporting Filtering Interfaces in the MAC Policy

Unfortunately, SELinux cannot distinguish among input interfaces in a single process. Some interfaces may only have to process high integrity data, such as the interface that reads a configuration file. Others have to be able to validate and upgrade certain types of low integrity data such as network input: these are filtering interfaces. In order to support filtering interfaces (and therefore to check analytic integrity), the SELinux user space library and kernel module was modified under the present invention to support two subject types per process instead of one. The default subject type is used for ordinary operation and allows inputs only from subjects in the application's TCB; this is enforced by policy analysis. The new filtering subject type, with additional permissions, is used for interfaces with the appropriate DO FILTER filtering annotation. Making an additional subject type for each application allows us the POLICE tool described below to be re-used.

An example of the required changes to the program and the security policy for filtering interfaces is given below:

| Before | After |
|---|---|
| Source Code | Source Code |
| conn = accept( ) | DO FILTER(conn = accept( )) |
| // accept( ) fails | // accept( ) succeeds |
| get http request(conn) | get http request sanitized(conn) |
| Security Policy | Security Policy |
| Apache: DENY accept | Apache: DENY accept |
| // network 62 TCB | Apache-filter: ALLOW accept |

The original program and policy are shown on the left. On the right, the DO FILTER( ) annotation is added to indicate that the accept( ) call is to be allowed where it ordinarily would not (since network input is low-integrity and thus outside the TCB). More precisely, the DO FILTER( ) call enables permission checking against the special filtering subject type. The annotation is a statement by the programmer that the input on the interface is sanitized. Note that the accept( ) system call is still constrained by the MAC policy for the filtering subject type, it may still be restricted. For example, the filtering subject type permissions for the application might allow accepting connections from one network interface, but not another. One might imagine taking this notion further, with separate subject types for each input interface. This is certainly possible, but would increase the complexity of the programmer annotations and the security policy. In the current model of the present invention, a single subject type to represent all filtering interfaces in a program is utilized.

G. MAC Policy Analysis

Under the present invention, a POLICE tool is employed to compute information flows from a SELinux MAC policy.

POLICE represents access control policies as graphs where the nodes are the SELinux subject types and permissions (e.g., allow writes to /tmp files"), and the edges are assignments of permissions to subject types. Based on whether the permission allows a mod operation, an obs operation, or both, POLICE computes an information flow graph that represents all the flow($s_i$; s) relationships.

Because the SELinux policy model also permits object re-labeling, we must consider information flows caused by modifying an object and re-labeling it to another object type. The re-label(s, obj, o, o') operation enables subject s to change an object obj's label from o to o'. Since re-labeling does not change the contents of an object, we do not really care who does the re-label, just that it can occur. Also, it does not typically matter which specific object can be relabeled, since all objects of the same object type are equivalent from an information flow perspective. Thus, we use a refined predicate re-label (o, o'). Next, we consider successive re-labeling operations o1→o2→ . . . →$o_i$. The transitive closure of the re-label operation is defined by re-label(o1; $o_i$). The re-label information flow rule states that:

$$mod(s1; o1)^\frown re\text{-}label(o1; o_i)^\frown obs(s_i; I; o_i) \rightarrow flow\ (s_1; s_i; I)$$

POLICE accounts for information flows due to arbitrary re-labeling. Given the set of information flows, the present invention uses POLICE to compute the information flows from low integrity subjects to the target subjects whose integrity is being verified, such as a privileged OpenSSH process. Privileged processes are represented by two subject types, one for its non-filtering interfaces and one for its filtering interfaces. Some of the non-target subjects may be designated as trusted. This set of subjects is referred to herein as the trusted subjects, and they form the system's TCB. The TCB includes subjects such as those that bootstrap the system (e.g., kernel and init), define the MAC policy (e.g., load policy), and perform administration (e.g., sysadm). POLICE uses its information graph to compute illegal information flows. Such a flow results when, an un-trusted subject writes to an object that is read by the target application through a non-filtering interface.

H. Finding Filtering Interfaces

Although SELinux is modified under the present invention to support mediation for filtering interfaces separately from other interfaces, a developer still needs to make annotations to tell SELinux at runtime whether a given interface performs filtering or not. As part of this process, the developer needs to determine which interfaces require filtering. This can be done this by running the policy analysis on the default policy in Section G. and analyzing all integrity-violating flows for the application. If some flows require filtering, the next step is to find out where in the application those flows occur. The problem of determining where in a program a permission is used is outside the scope of SELinux's goals, so a new mechanism is implemented under the present invention. To this extent, a new operation in SELinux is defined called "settraceonerror" using the "sysfs" interface. Appropriate changes were also made to both SELinux's user library and its kernel module. When the new settraceonerror(true) function is called from user space, the modified SELinux module signals the process whenever a violation of the SELinux policy is found. The user library traps the process into a separate xterm debugger (gdb) when the signal is caught. If the process forks, additional xterm windows with debuggers on the child processes are launched. Once in the debugger, it is much easier, using stack traces and data inspection, to determine where and why a permission error occurred and take appropriate action, either removing the offending operation or implementing a filtering interface. Note that some filtering interfaces may not need to actually filter the incoming data, since some reads in practice do not involve interpretation of the incoming data. For example, "logrotate" enables automatic rotation of log files, but does not depend on the data in the files. Likewise, the cp utility copies files, but does not consider their contents. In these cases, a DO FILTER annotation is still appropriate as long as the input code is careful to avoid, e.g., buffer overruns due to the length or other meta properties of the input data. If the set of filtering interfaces changes, the developer or other application maintainer should make the appropriate change to the standard (shipping) security policy for the application.

I. Handling Illegal Information Flows

If the policy analysis tool detects illegal information flows implied by a set of permissions, one of a few actions is required on the part of the sysadmin. Some such permissions are simply unneeded and may be removed. Some information flows may be required by programs that are low integrity, but optional to the system. One way to remove this information flow is to exclude the offending code and subjects that run the code from the system. Some permissions are needed by optional components of the target app; the option may be disabled, and the permissions removed. If the permission is used by the core application, then either the sysadmin may be assuming a smaller TCB than the developer or the developer has not added a DO FILTER annotation. The sysadmin can either not run the program or get the developer to write or annotate additional filtering interfaces.

III. Typical Embodiment

In this section a typical embodiment of the present invention will be described. As indicated above, the present invention generally allows (e.g., analytic) integrity of a system (i.e., a target application thereof) to be remotely verified. A benefit of analytic integrity is that since it aims for quantifiable integrity, it is used hereunder to construct attestations of its properties. Attestations are statements from a hardware root of trust of a system that a remote party can use to judge the integrity of that system. While performing integrity verification on security-critical applications on a system is important for the user or administrator of that system, allowing remote parties to verify the system's integrity can have additional benefits. For example, people connecting to a web site may want some assurance that the system is properly set up before revealing personal information. Network administrators may want to check that laptops are configured appropriately before allowing them onto a local network.

Among other things, the present invention utilizes a hardware root of trust, such as the Trusted Computing Group's (TCG's) Trusted Platform Module (TPM), to prove an integrity property of a system to a remote party, namely, attesting to the set of processes that have been run on that system. It does so by collecting measurements (hashes over the binaries) of all the code loaded on the system (executables, libraries, and kernel modules) and other files that may contribute to the integrity of the system, such as configuration files. This is such that system integrity could be derived from the measurement of the code running on that system and proven to a remote party (e.g., for remote access to corporate intranets).

The attestation-enabled kernel collects the individual measurements in a hash chain called measurement list, and maintains a hash commitment to the list in the TPM each time a measurement is added to the list. A variety of tasks can be performed to ensure that the measurement list is updated as required. For example, the kernel re-measures modified files if they are still being used. Ultimately, the TPM can issue a signed attestation that includes the current hash chain value on request. Briefly, the remote party can verify that each item in the measurement list corresponds to an acceptable file and the attestation ensures the integrity of the measurement list itself.

Analytic integrity lends itself to a natural extension of this form of attestation. In addition to knowing what code has run, analytic integrity attestation requires knowing how those processes interact in terms of information flows, so that a remote party can deduce whether an application that it wants to trust is isolated from all un-trusted processes in the system. Still yet, the present invention also utilizes the following set of additional measurements for a remote party to verify analytic integrity:

1. MAC (hereinafter "access control") Policy: The access control policy sets forth the system information flows. Specifically, the access control policy sets forth information flows between applications and files (including the target application). Under the present invention, applications are defined by subject. As such, each application has at least one subject label. Furthermore, files are defined by object to/from subjects will read/write. To this extent, the access control policy sets forth the information flows by subject label and object label.

2. Trusted Subjects: The set of trusted subjects (TCB) that interact with the target application. The remote party must agree that this set contains only subjects that it trusts as well.

3. Code-Subject Mapping: For all code measured, the runtime mapping between the code and the subject type under which it is loaded is recorded. For example, 'ls' may be run by normal users or trusted administrators such that we might want to trust only the output of trusted programs run by trusted users. If the same code is run under two subject types, then two measurements can be taken. However, subsequent loads under a previously-used subject type are not measured.

To utilize these concepts to remotely verify analytic integrity, the following process will be followed under the present invention. At system startup, the access control policy and the set of trusted subject is read/measured. From these, the remote party will construct an information flow graph. The remote party can verify from the graph that all "edges" into the target application are either from trusted subjects (that are verified at runtime only to run trusted code) or from un-trusted subjects via filtering interfaces. Next, runtime information is optionally measured i.e., additional information related to the measured program code (e.g., user/group id, label, process configuration data). Due to the information flow graph, the remote party need only measure the code that is depended upon (i.e., trusted subjects' code). All others are assumed un-trusted. In addition, a runtime the mapping between the (program) code loaded and the trusted subject in which the code is loaded is measured. This allows the remote party to verify that the expected code is executed for the subject. This is analogous to measuring the UID a program runs as in traditional UNIX. An important issue is that the code measurement be sufficient to justify the interface properties of analytic integrity. The verification of filtering interfaces and leak prevention are associated with the code, which may be checked by the remote party in whatever way it desires. Therefore, a digest of the code indicates both its integrity and its integrity protection properties. No additional measurements are necessary to record the interface behavior in particular.

IV. Computerized Implementation

Referring now to FIG. 1, a more specific computerized implementation 10 of the present invention is shown. As depicted, implementation 10 includes a computer system/environment 12 in communication with a remote computer system 14. It should be understood that system 12 is intended to represent any computer system, computer environment, etc., that contains files 20A-B and applications 22A-C, and for which an analytic integrity is verified remotely (e.g., by remote party 24 via remote computer system 14). In any event, systems 12 and 14 typically communicate over a network (e.g., the Internet, a wide area network (WAN), a local area network (LAN), a virtual private network (VPN), etc.) that can utilize any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, although not shown, some or all of the components of implementation 10 could be deployed, managed, serviced, etc. within a computer infrastructure (not shown) by a service provider who offers to remotely verify an analytic integrity of a system (e.g., a target application therein) for customers.

As shown, remote computer system 14 includes a processing unit 30, a memory 32, a bus 34, and input/output (I/O) interfaces 36. Further, remote computer system 14 is shown in communication with external I/O devices/resources 38 and storage system 40. In general, processing unit 30 executes computer program code, such as verification system 50, which is stored in memory 32 and/or storage system 40. While executing computer program code, processing unit 30 can read and/or write data to/from memory 32, storage system 40, and/or I/O interfaces 36. Bus 34 provides a communication link between each of the components in remote computer system 14. External devices 38 can comprise any devices (e.g., keyboard, pointing device, display, etc.) that enable a user to interact with remote computer system 14 and/or any devices (e.g., network card, modem, etc.) that enable remote computer system 14 to communicate with one or more other computing devices.

Remote computer system 14 is only representative of various possible computer systems that can include numerous combinations of hardware. To this extent, in other embodiments, remote computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 30 may comprise a single processing unit, or be distributed across one or more processing units in one or more locations, e.g., on a client and server. Similarly, memory 32 and/or storage system 40 can comprise any combination of various types of data storage and/or transmission media that reside at one or more physical locations. Further, I/O interfaces 36 can comprise any system for exchanging information with one or more external devices 38. Still further, it is understood that one or more additional components (e.g., system software, math co-processing unit, etc.) not shown in FIG. 1 can be included in remote computer system 14. However, if remote computer system 14 comprises a handheld device or the like, it is understood that one or more external devices 38 (e.g., a display) and/or storage system(s) 40 could be contained within remote computer system 14, not externally as shown.

Storage system 40 can be any type of system (e.g., a database) capable of providing storage for information under the present invention, access control policies, listings of trusted subjects, runtime information, loaded code, information flow graphs, etc. To this extent, storage system 40 could include one or more storage devices, such as a magnetic disk drive or an optical disk drive. In another embodiment, storage system 40 includes data distributed across, for example, a local area network (LAN), wide area network (WAN) or a storage area network (SAN) (not shown). Although not shown, additional components, such as cache memory, communication systems, system software, etc., may be incorporated into remote computer system 14. Further, it should be understood that system 12 can include computerized components similar to remote computer system 14.

Shown in memory 32 of remote computer system 14 is verification system 50, which is a software program that will provide the functions of the present invention, and which includes policy system 52, subject system 54, graph system 56, runtime information system 58, and code system 60. In general, these systems represent program code that carries out the steps of the present invention as described above. Specifically, assume that application 22A is the target application for which analytic integrity will be remotely verified. At startup of system 12, policy system 52 will measure/read an access control policy that sets forth information flows in system 12. As indicated above, such information flows generally occur between applications 22A-C and/or files 20A-B, and are set forth based on subject and object. Also at startup, subject system 54 will identify a set of trusted subjects for target application 22A. Each application 22A-C could have one or more other applications that are inherently trusted to communicate therewith. Each such trusted application will be identified based on subject by subject system 54. It should be appreciated that the access control policy and set of trusted subjects could be provided from system 12, or could be accessed by remote computer system 14 from another location/source.

Based on the access control policy and the set of trusted subjects, graph system 56 will construct an information flow graph depicting the information flows, and then verify that all "edges" into the target application 22A are from one of the set of trusted subjects or from an un-trusted subject via a filtering interface. Then, at runtime of target application 22A, runtime information system 58 will optionally measure pieces of runtime "environment" information, i.e., additional information related to the measured program code (e.g., user/group id, label, process configuration data), and code system 60 will measured the program code that is loaded into the set of trusted subjects. Collectively, the information flow graph, runtime information and loaded program code will be used to verify the analytic integrity of target application 22A. This integrity determination 62 can be made independently by remote party/administrator 24 or by a determination system (not shown) within verification system 50. In the case of the latter, a set of standards could be provided to remote computer system 14 to which the specifics for target application 22A are compared. Based on the comparison, an integrity determination 62 could be made.

While shown and described herein as a method and system remotely verifying integrity, it is understood that the invention further provides various alternative embodiments. For example, in one embodiment, the invention provides a computer-readable/useable medium that includes computer program code to enable a computer infrastructure to remotely verify integrity. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 32 and/or storage system 40 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to remotely verifying analytic integrity. In this case, the service provider can create, maintain, support, etc., a computer infrastructure, that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for remotely verifying integrity. In this case, a computer infrastructure, can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as remote computer system 14, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for remotely verifying integrity of a system, which includes a computer device, comprising:

reading an access control policy that sets forth information flows within the system having a plurality of subjects and objects, the plurality of subjects including a plurality of applications, the information flows indicating whether a subject is allowed access to an object based on an integrity level of each;

determining a set of trusted subjects from the plurality of subjects in the system that interact with a target application in the system;

constructing an information flow graph of the system based on the access control policy and the set of trusted subjects that includes all interfaces into the target application from the plurality of subjects and whether each interface is a filtering interface that discards or upgrades low integrity data or is an unfiltered interface; and measuring, by a party that is remote from the system, program code loaded into the set of trusted subjects to verify that only expected code is executed for a trusted subject of the set of trusted subjects such that all program code that is loaded into the trusted subject is from an untrusted subject via a filtering interface or is via an unfiltered interface from a trusted subject.

2. The computer-implemented method of claim 1, the information flows in the access control policy being information flows between applications and files of the system, and the information flows being defined in the access control policy based on subject.

3. The computer-implemented method of claim 1, the information flow graph being used to remotely verify that edges into the target application originate from one of the set of trusted subjects or from an un-trusted subject via a filtering interface.

4. The computer-implemented method of claim 1, further comprising remotely verifying that the program code loaded into the set of trusted subjects is expected code for the set of trusted subjects based on the measuring step.

5. The computer-implemented method of claim 1, the reading and determining steps being performed at startup of the system.

6. The computer-implemented method of claim 1, the measuring step being performed at runtime of the target application.

7. The computer-implemented method of claim 1, further comprising measuring runtime information of the system.

8. A system for remotely verifying integrity of a system, comprising at least one computer device that performs a method, comprising:

reading an access control policy that sets forth information flows within the system having a plurality of subjects and objects, the plurality of subjects including a plurality of applications, the information flows indicating whether a subject is allowed access to an object based on an integrity level of each;

determining a set of trusted subjects from the plurality of subjects in the system that interact with a target application in the system;

constructing an information flow graph of the system based on the access control policy and the set of trusted subjects that includes all interfaces into the target application from the plurality of subjects and whether each interface is a filtering interface that discards or upgrades low integrity data or is an unfiltered interface; and measuring, by a party that is remote from the system, program code loaded into the set of trusted subjects to verify that only expected code is executed for a trusted subject of the set of trusted subjects such that all program code that is loaded into the trusted subject is from an untrusted subject via a filtering interface or is via an unfiltered interface from a trusted subject.

9. The system of claim 8, the information flows in the access control policy being information flows between applications and files of the system, and the information flows being defined in the access control policy based on subject.

10. The system of claim 8, the information flow graph being used to remotely verify that edges into the target application originate from one of the set of trusted subjects or from an un-trusted subject via a filtering interface.

11. The system of claim 8, the access control policy being read and the set trusted subjects being determined at startup of the system.

12. The system of claim 8, the program code being measured at runtime of the target application.

13. The system of claim 8, the method further comprising measuring runtime information of the system.

14. A program product stored on a computer readable storage device for remotely verifying integrity of a system, the program product comprising program code for causing a computer system to perform the following steps:

reading an access control policy that sets forth information flows within the system having a plurality of subjects and objects, the plurality of subjects including a plurality of applications, the information flows indicating whether a subject is allowed access to an object based on an integrity level of each;

determining a set of trusted subjects from the plurality of subjects in the system that interact with a target application in the system;

constructing an information flow graph of the system based on the access control policy and the set of trusted subjects that includes all interfaces into the target application from the plurality of subjects and whether each interface is a filtering interface that discards or upgrades low integrity data or is an unfiltered interface;

measuring runtime information of the system; and measuring, by a party that is remote from the system, program code loaded into the set of trusted subjects to verify that only expected code is executed for a trusted subject of the set of trusted subjects such that all program code that is loaded into the trusted subject is from an untrusted subject via a filtering interface or is via an unfiltered interface from a trusted subject.

15. The program product of claim 14, the information flows in the access control policy being information flows between applications and files of the system, and the information flows being defined in the access control policy based on subject.

16. The program product of claim 14, the information flow graph being used to remotely verify that edges into the target application originate from one of the set of trusted subjects or from an un-trusted subject via a filtering interface.

17. The program product of claim 14, the access control policy being read and the set trusted subjects being determined at startup of the system.

18. The program product of claim 14, the program code being measured at runtime of the target application.

19. A method for deploying an application for remotely verifying integrity of a system, comprising:

providing a computer infrastructure having a computer device being operable to:

read an access control policy that sets forth information flows within the system having a plurality of subjects and objects, the plurality of subjects including a plurality of applications, the information flows indicating whether a subject is allowed access to an object based on an integrity level of each;

determine a set of trusted subjects from the plurality of subjects in the system that interact with a target application in the system;

construct an information flow graph of the system based on the access control policy and the set of trusted subjects that includes all interfaces into the target application from the plurality of subjects and whether each interface is a filtering interface that discards or upgrades low integrity data or is an unfiltered interface; and measure, by a party that is remote from the system, program code loaded into the set of trusted subjects to verify that only expected code is executed for a trusted subject of the set of trusted subjects such that all program code that is loaded into the trusted subject is from an untrusted subject via a filtering interface or is via an unfiltered interface from a trusted subject.

20. The method of claim 19, the computer infrastructure being further operable to measure runtime information of the system.

* * * * *